(12) United States Patent
Olofsson

(10) Patent No.: US 12,462,512 B2
(45) Date of Patent: Nov. 4, 2025

(54) METHOD FOR ADJUSTING A SIZE OF A VIRTUAL SCENE COMPRISING A PLURALITY OF OBJECTS

(71) Applicant: Inter IKEA Systems B.V., Ln Delft (NL)

(72) Inventor: Olis Olofsson, Malmö (SE)

(73) Assignee: Inter IKEA Systems B.V., Ln Delft (NL)

( * ) Notice: Subject to any disclaimer, the term of this patent is extended or adjusted under 35 U.S.C. 154(b) by 154 days.

(21) Appl. No.: 18/443,335

(22) Filed: Feb. 16, 2024

(65) Prior Publication Data
US 2024/0282067 A1 Aug. 22, 2024

(30) Foreign Application Priority Data

Feb. 20, 2023 (SE) .................................... 2350193-5

(51) Int. Cl.
*G06T 19/20* (2011.01)
*G06V 10/74* (2022.01)

(52) U.S. Cl.
CPC ............ *G06T 19/20* (2013.01); *G06V 10/761* (2022.01); *G06T 2219/2004* (2013.01); *G06T 2219/2016* (2013.01); *G06V 2201/07* (2022.01)

(58) Field of Classification Search
CPC ............ G06T 19/20; G06T 2219/2004; G06T 2219/2016; G06V 10/761; G06V 2201/07
See application file for complete search history.

(56) References Cited

U.S. PATENT DOCUMENTS

2019/0313059 A1* 10/2019 Agarawala ............. G06F 3/011

* cited by examiner

*Primary Examiner* — Grace Q Li
(74) *Attorney, Agent, or Firm* — Renner, Otto, Boisselle & Sklar, LLP

(57) ABSTRACT

The present disclosure relates to the technical area of building design and construction. The methods, systems and computer-readable storage mediums described herein may be used for creating detailed plans and designs for rooms and spaces within a building, including the layout, functionality, and overall aesthetic. In particular, the present invention relates to repositioning, replacing or deleting an object in a virtual scene such that objects in the scene still fits in the virtual scene having the new size.

15 Claims, 5 Drawing Sheets

METHOD FOR ADJUSTING A SIZE OF A VIRTUAL SCENE COMPRISING A PLURALITY OF OBJECTS

CROSS-REFERENCE TO RELATED APPLICATION

This application claims priority from Swedish Patent Application No. 2350193-5, filed Feb. 20, 2023, hereby incorporated by reference in its entirety.

TECHNICAL FIELD

The present disclosure relates to the technical field of interior construction and design of building. The methods, systems and computer-readable storage mediums described herein may be used for creating detailed plans and designs for rooms and spaces within a building, including the layout, functionality, and overall aesthetic. In particular, the present invention relates to repositioning, replacing or deleting an object in a virtual scene such that objects in the scene still fit in a virtual scene having the new size.

BACKGROUND

A digital planner tool may be used for creating virtual floor plans and layouts of a virtual scene (such as parts of a room, a full room, several rooms, apartment, etc.). It may allow users to design and visualize a room with furniture and other decor items before committing to any actual purchases or refurbishing. It can be used for planning the layout of a new space, such as a home, an apartment, or an office, or for redesigning an existing space. Room planner tools can also be used to experiment with different design and layout options, test out various furniture arrangements, and choose colors and materials for walls, floors, and other surfaces. Using a planner tool can save much time, effort, and resources, as it allows users to quickly try out different design options, experiment with different furniture and decor, and make changes to the layout as needed.

When a user changes the size of a virtual scene in a planner tool, the software may automatically adjust the elements in the virtual scene to match the new dimensions, for example by repositioning any objects (e.g., furniture, decorations, paintings, carpets, etc.). However, in this process, the user may need to pay attention to the proportion of each object in the virtual scene, such as furniture and decor, to ensure that they still look visually balanced. Moreover, various regulations and codes may exist that dictate the placement of furniture in a house, particularly in certain areas such as bathrooms and kitchens. Regulations may relate to providing a clear path for people in a building, particularly those with mobility impairments, regulations for fire safety, clearances around appliance in a kitchen, etc. The user may not be aware of such regulations and thus risk to plan for objects that may not fulfil these.

There is thus a need for improvements within this context.

SUMMARY

In view of the above, it is thus an object of the present invention to overcome or at least mitigate the problems discussed above. Especially, it is an object to provide methods, systems and non-transitory computer-readable storage mediums which automatically adjust or modify objects in a virtual scene upon receiving a request to change the size of the virtual scene.

According to a first aspect of the present invention, there is provided a computer implemented method comprising the steps of: identifying a plurality of objects in a virtual scene, the virtual scene having a size; for each object of the plurality of objects, determining a subspace within the virtual scene occupied by the object; receiving a request to reduce the size of the virtual scene; detecting that at least one object of the plurality of objects does not fit the reduced size of the virtual scene; upon detecting that at least one object of the plurality of objects does not fit the reduced size of the virtual scene, repositioning at least one object of the plurality of objects in the virtual scene such that each object of the plurality of objects fits the scene; after the repositioning, based on the subspace of a first object of the plurality of objects, detecting that a placement of the first object in the virtual scene violates at least one rule applicable to the virtual scene; and upon detecting that the placement of the first object in the virtual scene violates the at least one rule applicable to the virtual scene, selecting one object of the plurality of objects.

The method may further comprise deleting the selected object from the virtual scene.

Alternatively or additionally, the method may further comprise determining a replacement object occupying a subspace of the scene being smaller compared to the subspace of the selected object, and replacing, in the virtual scene, the selected object with the replacement object.

The provided method may advantageously enable improvements to user experience when a size of a virtual scene changes, when the virtual scene already comprises objects. When the size of the virtual scene is reduced, the intended functions of the virtual scene may remain as long as possible. For example, automatic repositioning of the objects in the virtual scene is provided, such that the objects will still fit the new dimensions of the virtual scene. However, if a new placement of an object, due to the repositioning, violates a rule applicable to the virtual scene, at least one object of the virtual scene is deleted or replaced with a smaller object such that the objects of the virtual scene may fit the new dimensions of the virtual scene.

The provided method may thus enable implementations of rules, strategies and codes, both regarding visual appearance/design of the virtual scene, functionality of the virtual scene, and regulations applicable to the virtual scene. For example, a replacement object may be determined such that the functionality (intended purpose) of the virtual scene still is maintained despite an object being replaced. In examples, rules may be implemented such that regulation applicable to the virtual scene is followed. Yet other examples include implementing rules such that design rules are followed, e.g., rules relating to balance, scale, lighting, etc.

The provided method may reduce user effort when a size of a virtual scene is changed, facilitating automatic repositioning, deletion, and replacement of objects to adjust to the new size. The provided method may reduce the risk of planning a virtual scene in a way that will not satisfy the user when made a reality, which may reduce the likelihood of returns, save resources, costs, improve inventory managements, improve user satisfaction, save costs, etc.

A rule may for example relate to how close to each other two objects may be positioned, or how much open space that is required in front of an object of a specific type, or how close to a wall in the virtual space an object may be positioned, etc. A rule may be based on the functionality of an object and/or the virtual space.

In some embodiments, the method further comprises, after deleting and/or replacing the selected object, the steps of detecting that at least one object of the plurality of objects does not fit the reduced size of the virtual scene; and repositioning at least one object of the plurality of objects in the virtual scene such that each object of the plurality of objects fits the scene. For example, if an object in the center of the virtual scene is deleted or replaced with a smaller object (thus increasing available/free space in the virtual scene), an object at the edge of the scene may still be positioned outside the boundaries of the virtual scene. In this case, at least this object may need to be replaced such that all objects fit the virtual scene. In some examples, all objects or a subset of objects are repositioned in this case.

In some embodiments, the request to reduce the size of the virtual scene comprises reducing a size of the virtual scene in at least one or more of a first, second and third dimension, wherein the step of repositioning at least one object of the plurality of objects in the virtual scene comprises moving the at least one object in a corresponding one or more of the first, second or third dimension. For example, if a size of a virtual space is reduced in a horizontal direction (e.g., in a 2D environment), one or more objects in the virtual space may be moved in that direction. Advantageously, this embodiment may reduce complexity of the method and thus reduce the computational resources required to implement the method.

In some embodiments, each object of the plurality of objects is associated with first metadata indicating at least one of: a smallest distance in the virtual scene from the subspace of the object to the subspace of an adjacent object among the plurality of objects, and a smallest distance in the virtual scene from the subspace of the object to a fixed feature of the virtual scene.

By the term "fixed feature of the virtual scene" should, in the context of the present specification, be understood as a feature or object that is permanent in the room and cannot be replaced or deleted, such as a wall, a door, piping, window, etc. The fixed feature may in some embodiments be a virtual feature, such as a virtual divider between different areas in the virtual scene to define sections of the virtual scene. For example, in an open floor plan where the kitchen and the living room does not have any physical dividers (e.g., walls) to separate the kitchen from the living room, such a virtual divider may be used. In this example, a sofa may not be placed too close to the virtual divider, and a similar limitation for the kitchen table position in the virtual scene may apply. The virtual divider may define an area of a surface (e.g., floor, wall, ceiling) of the virtual space, or a volume in the virtual space such as a box, a sphere, a cylinder etc. In other words, a virtual divider may separate an open space into a plurality of solution surfaces or functional spaces.

Advantageously, this embodiment allows for flexible rules defining how close to each other two objects may be placed or how close to e.g., a wall or a window an object can be positioned without violating a rule applicable to the virtual scene.

In some embodiments, the step of detecting that a placement of the first object in the virtual scene violates at least one rule applicable to the virtual scene is further based on the subspace of a second object of the plurality of objects. For example, the rule may define how close an object may be placed to an adjacent object in the virtual scene. The rule may be based on a type of the first and/or the second object. In other examples, the rule may define how much area/volume of a particular part of the virtual scene that may be occupied by objects in that particular part of the virtual scene, or how much floor space that must be available in a particular part of the virtual scene. Advantageously, this embodiment allows for more flexible rules and a more efficient method.

In examples, the step of detecting that a placement of the first object in the virtual scene violates at least one rule applicable to the virtual scene may comprise: identifying a smallest distance between the first and the second object based on the first metadata associated with the first and the second object; detecting a distance between the subspace of the first object in the virtual scene and the subspace of the second object in the virtual scene; upon the distance being smaller than the smallest distance, detecting that placement of the first object in the virtual scene violates at least one rule applicable to the virtual scene. Advantageously, this embodiment allows for flexible rules defining how close to each other two objects may be placed. Moreover, using a defined smallest distance for each object to determine if the rule is violated or not may provide a low complexity way of achieving flexible rules.

In examples, the step of detecting that a placement of the first object in the virtual scene violates at least one rule applicable to the virtual scene comprises: identifying a smallest distance between the first object and a fixed feature of the virtual scene based on the first metadata associated with the first object; detecting a distance between the subspace of the first object in the virtual scene and a fixed feature of the virtual scene; and upon the distance being smaller than the smallest distance, detecting that placement of the first object in the virtual scene violates said at least one rule applicable to the virtual scene. Advantageously, this embodiment allows for flexible rules defining how close to a fixed feature of the virtual scene an object may be placed.

In examples, the step of repositioning at least one object of the plurality of objects in the virtual scene comprises moving each object of the plurality of objects towards a center of the virtual scene according to the new size of the scene. Consequently, a low complexity implementation of fitting all objects in the virtual scene, having a reduced size, may be achieved.

In some embodiments, the method further comprises receiving a request to increase the size of the virtual scene; selecting one object of the plurality of objects; determining a replacement object occupying a subspace of the scene being larger compared to the subspace of the selected object, and replacing, in the virtual scene, the selected object with the replacement object. Consequently, the method may also define what happens when the size of the virtual scene is increased, which may allow for implementations of rules, strategies and codes, both regarding visual appearance/design of the virtual scene, functionality of the virtual scene, and regulations applicable to the virtual scene.

In some embodiments, each of the plurality of objects is associated with a level of importance of the object in the scene, wherein the step of selecting one object comprises identifying the object from the plurality of objects with a comparably lowest level of importance. The level of importance may be defined by a user, and/or automatically based on functionality of the objects and/or intended use of the virtual scene. For example, if the virtual scene is intended to correspond to a bedroom, an object corresponding to a bed may be considered more important than an object corresponding to a closet which in turn may be considered more important than an object corresponding to a bedside table. Advantageously, this embodiment may allow for automatically or manually defined hierarchies among the objects in the virtual scene which may allow for implementations of rules, strategies and codes, both regarding visual appearance/design of the virtual scene, functionality of the virtual scene, and regulations applicable to the virtual scene. The level of importance may be defined in metadata relating to the objects and/or the virtual scene, as a configuration for a software product implementing the method, etc.

In some embodiment, at least some of the objects among the plurality of objects is associated with a respective second metadata indicating one or more replacement objects, wherein the step of determining a replacement object comprises selecting one of the one or more replacement objects indicated in the second metadata associated with the object being replaced. The replacement objects for a particular object may be defined by a user, and/or automatically based on functionality of the object, style of the object, price of the object and/or intended use of the virtual scene. For example, each object of the plurality of objects may be associated with a category, wherein each of the replacement objects are associated with a respective category, wherein the step of selecting one of the one or more replacement objects is based at least in part on a comparison between the category associated with the object being replaced and the category of each of the one or more replacement objects. Advantageously, these embodiments may allow for automatically and/or manually defined replacement objects for each object in the virtual scene which may allow for implementations of rules, strategies and codes, both regarding visual appearance/design of the virtual scene, functionality of the virtual scene, and regulations applicable to the virtual scene.

According to some embodiments, the method further comprises receiving, from a user, a repositioning request for an object of the plurality of, the rearranging request indicating a location for said object in the virtual scene; and repositioning the object in the virtual scene according to the repositioning request. Advantageously, the present embodiment allows for manual repositioning of the objects in the virtual scene, which in turn may increase flexibility of the method.

According to a second aspect of the invention, the above object is achieved by a non-transitory computer-readable storage medium having stored thereon instructions for implementing the method according the first aspect when executed on a device having processing capabilities.

According to a third aspect of the invention, the above object is achieved by system comprising: one or more processors; and one or more non-transitory computer-readable media storing computer executable instructions that, when executed by the one or more processors, cause the system to perform actions comprising: identifying a plurality of objects in a virtual scene, the virtual scene having a size; for each object of the plurality of objects, determining a subspace within the virtual scene occupied by the object; receiving a request to reduce the size of the virtual scene; detecting that at least one object of the plurality of objects does not fit the reduced size of the virtual scene; upon detecting that at least one object of the plurality of objects does not fit the reduced size of the virtual scene, repositioning at least one object of the plurality of objects in the virtual scene such that each object of the plurality of objects fits the scene; after the repositioning, based on the subspace of a first object of the plurality of objects, detecting that a placement of the first object in the virtual scene violates at least one rule applicable to the virtual scene; upon detecting that the placement of the first object in the virtual scene violates the at least one rule applicable to the virtual scene, selecting one object of the plurality of objects, and at least one of: deleting the selected object from the virtual scene; and determining a replacement object occupying a subspace of the scene being smaller compared to the subspace of the selected object, and replacing, in the virtual scene, the selected object with the replacement object.

The system may be implemented in a single device or in a plurality of devices.

According to some embodiments, each object of the plurality of objects is associated with first metadata indicating a smallest distance in the virtual scene from the subspace of the object to the subspace of an adjacent object among the plurality of objects, wherein detecting that a placement of the first object in the virtual scene violates at least one rule applicable to the virtual scene comprises: identifying a smallest distance between the first object and a second object of the plurality of objects based on the first metadata associated with the first and the second object; detecting a distance between the subspace of the first object in the virtual scene and the subspace of the second object in the virtual scene; upon the distance being smaller than the smallest distance, detecting that placement of the first object in the virtual scene violates said at least one rule applicable to the virtual scene.

According to some embodiments, each of the plurality of objects is associated with a level of importance of the object in the scene, wherein selecting one object comprises identifying the object from the plurality of objects with a comparably lowest level of importance.

The second and third aspects may generally have the same features and advantages as the first aspect. It is further noted that the disclosure relates to all possible combinations of features unless explicitly stated otherwise.

BRIEF DESCRIPTION OF THE DRAWINGS

The above, as well as additional objects, features, and advantages of the present invention, will be better understood through the following illustrative and non-limiting detailed description of embodiments of the present disclosure, with reference to the appended drawings, where the same reference numerals will be used for similar elements, wherein.

DETAILED DESCRIPTION

The present disclosure will now be described more fully hereinafter with reference to the accompanying drawings, in which embodiments of the disclosure are shown. The systems, devices and modules disclosed herein will be described during operation. When referring to "the system" taking decisions etc., this may indicate that algorithms are implemented to do this automatically.

The present disclosure relates to the technical area of interior construction and design of building. When providing automated tools within this field, e.g., a tool for planning a space such as a room, it may be advantageous to define the methods and algorithms implemented by the tools such that rules, strategies and codes, both regarding visual appearance/design of the space, functionality of the space, and regulations applicable to the space may be automatically adhered to when using such a tool. The size of the space to be planned may be considered when defining which objects that may fit into the space, as well as positions of these objects within the space. Also, the functionality of the space may be considered, such that independently of the size of the space (within reasons), objects facilitating such functionality are included in the space. Methods/algorithms, systems, and computer-readable storage mediums suitable for planning a space according to the above requirements will now be described in conjunction with FIGS. 1-5.

Figure 1A:
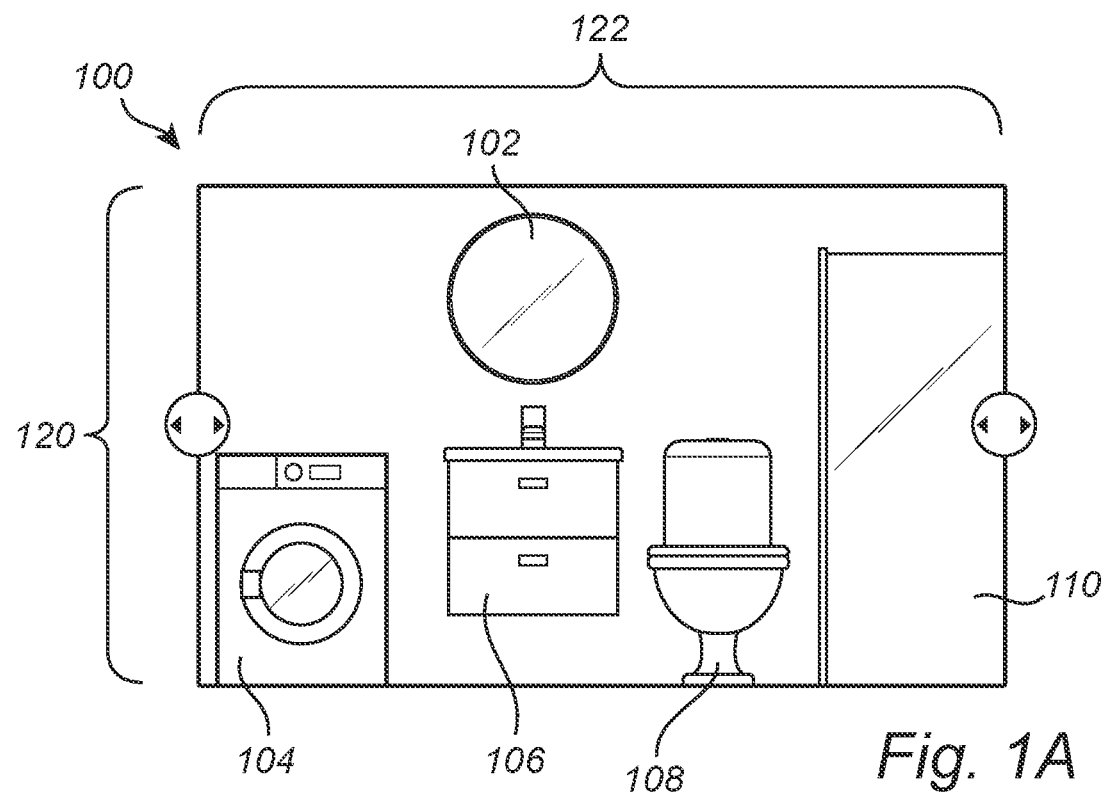
FIG. 1A shows a virtual scene comprising a plurality of objects according to embodiments, FIG. 1B exemplifies repositioning of objects in the virtual scene of FIG. 1A when the size of the virtual scene is reduced.

FIG. 1A shows an example of a virtual scene 100 defining a digital version of a space/room to be planned. In the following, the virtual scene 100 is shown as a 2D view. However, the methods described herein may also be implemented in a 3D tool. The virtual scene and the methods described herein may be implemented by instructions stored on a non-transitory computer-readable storage medium such as a memory of a computer or server and provided as software as a service and thus accessed over the internet (for example via a web browser), or as software installed and run on a local computer or on-premises infrastructure. A system implementing the methods described herein may comprise one or more processors and one or more non-transitory computer-readable media storing computer executable instructions for implementing the methods and algorithms described herein. Generally, the system may comprise circuitry which is configured to implement the method and more specifically the functionality described herein. Put differently, the described features in the system can be implemented advantageously in one or more computer programs that are executable on a programmable system including at least one programmable processor coupled to receive data and instructions from, and to transmit data and instructions to, a data storage system. The system may in some embodiments comprise at least one input device such as a keyboard, and at least one output device such as a display. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits).

The virtual scene 100 in FIG. 1A corresponds to a bathroom having a size 120, 122. This is just an example, and the virtual scene may correspond to any space to be planned.

The virtual scene 100 comprises a plurality of objects, including a mirror 102, a washing machine 104, a sink with drawers 106, a toilet 108 and a shower cabin 110. Each object 102-110 occupies a subspace within the virtual scene, i.e., a space used by a body of the object. In the example of FIG. 1A, being a 2D implementation, a subspace corresponds to an occupied area of a vertical surface (e.g., a wall) in the virtual scene. In a 2D implementation from another view, e.g., from above, a subspace corresponds to an occupied area of a horizontal surface (e.g., a floor) in the scene. In a 3D implementation, a subspace corresponds to an occupied volume within the volume of the virtual scene. Generally, a subspace (subregion) within the virtual scene is a subset of the virtual scene that inherits the dimensionality of the virtual scene. In other words, it is a smaller space (subspace) within a larger space (virtual scene), wherein the subspace having the same dimensionality as the larger space.

Figure 1B:
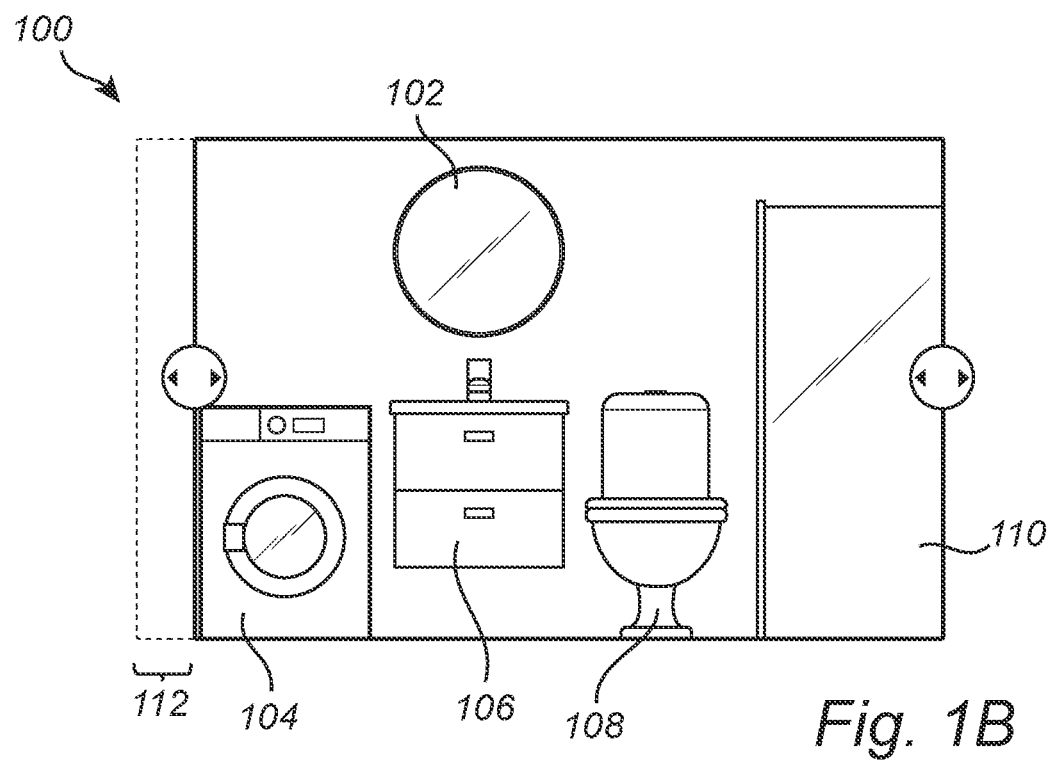

In FIG. 1B, a request to reduce the size in a horizontal direction is received. The reduction corresponds to reducing the horizontal dimension with a length 112. In case none of the objects 102-110 are moved (e.g., kept at the same horizontal position as in FIG. 1A), the washing machine 104 will be positioned outside of the outer perimeter of the virtual space 100. Consequently, it is detected that at least one object 104 of the plurality of objects does not fit the reduced size of the virtual scene. To fit all objects 102-110, at least one object of the plurality of objects 102-110 in the virtual scene 100 needs to be repositioned such that each object of the plurality of objects 102-110 fits the virtual scene 110. In the example of FIG. 1A, all objects 102-110 are repositioned. Moreover, since the request to reduce the size of the virtual scene 100 meant reducing the size of the virtual scene in a horizontal direction, the repositioning is in this example only made in the same direction (i.e., in a horizontal direction). The mirror 102 is still positioned in a same vertical position for example. In case the request to reduce the size of the virtual scene meant reducing the size of the virtual scene in a vertical direction instead, the mirror 102 might for example be moved in the vertical direction (if needed) while the objects 104, 108, 110 positioned at the floor of the virtual scene 100 might not be moved or moved to still be in contact with the floor.

In the example of FIG. 1B, each object 102-110 of the plurality of objects is moved towards a center of the virtual scene according to the new size of the scene. In other examples, only one object may move, e.g., the washing machine 104 may move towards the sink with drawers 106.

Figure 2:
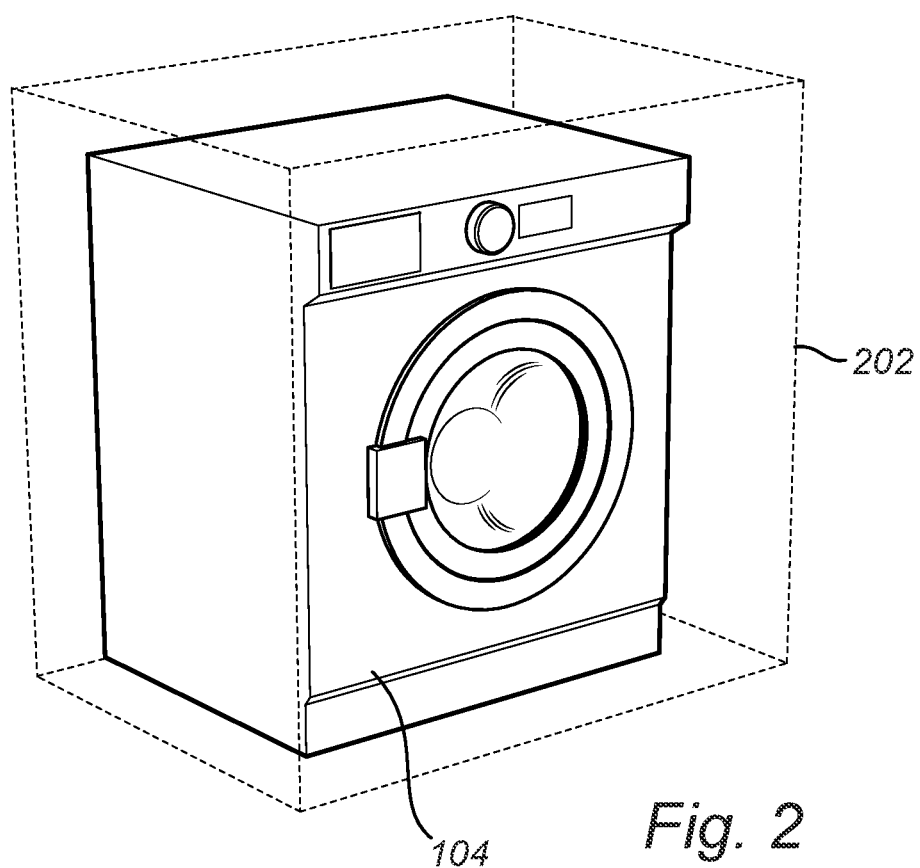
FIG. 2 shows an object including a defined smallest distance to an adjacent object in the virtual scene, according to embodiments.

FIG. 2 shows the washing machine 104 from FIGS. 1A-B, including a smallest allowable distance in the virtual scene from the subspace (body) of the washing machine 104 to e.g., another object 102, 106-110 in the scene. The smallest allowable distance is represented by a bounding box 202 being larger than the body of the washing machine in at least one dimension. The bounding box 202 may in some embodiments also restrict how close the washing machine may be placed to a wall, piping, doors or other fixed structural elements or fixed features of the space (e.g., room) that is being designed. A fixed feature of the virtual space refers to the permanent and irreplaceable components of the architecture and design of the virtual space such as walls, ceiling, floor, windows, piping, etc. The bounding box 202 may in some embodiments apply to only one or some of the fixed features of the virtual space 100. For example, the bounding box 202 may define a smallest distance to a door but not to a wall.

A rule applicable to the virtual scene may for example specify that an object in the virtual scene may not be positioned closer to another object in the virtual scene than what is specified by the bounding box 202. Put differently, detecting that the placement of the washing machine 104 in the virtual scene violates at least one rule applicable to the virtual scene is based on both the subspace of the washing machine 104 and the subspace of the sink 106. For example, in case a smallest allowable distance between the washing machine 104 and the sink 106 is defined (as will be described further below in conjunction with FIG. 3), the rule may be violated if the placement of the washing machine 104 and the sink 106 results in that subspace of the washing machine 104 and the subspace of the sink 106 are positioned closer than that. In case no such smallest allowable distance is defined, the rule may be violated if the placement of the washing machine 104 and the sink 106 results in that subspace of the washing machine 104 and the subspace of the sink 106 overlaps or collides.

The smallest distance (bounding box) may be stored in metadata associated to each of the objects 102-110 in the virtual scene. The smallest distance may be used to fulfil regulations and codes that dictate the placement of an object in space. The smallest distance may also be used to facilitate visual balance or other design considerations that applies to the virtual scene in question.

Figure 3:
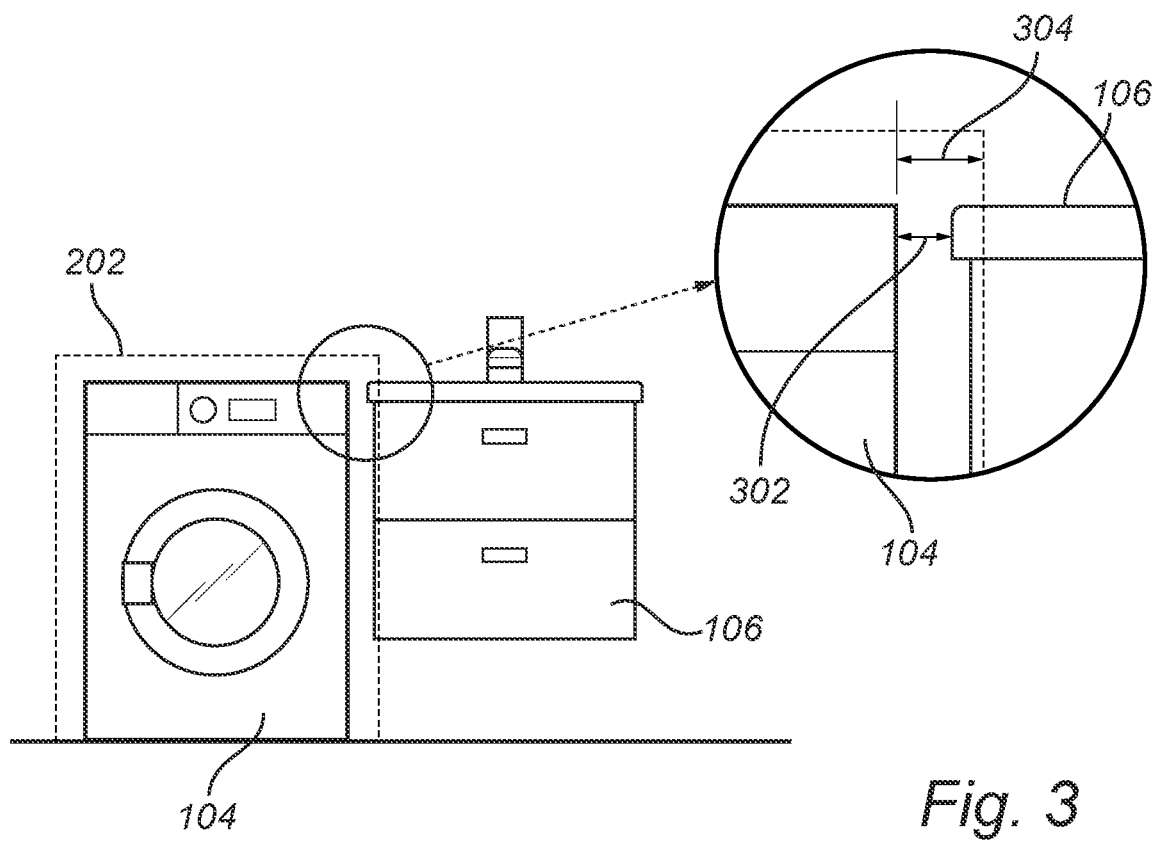
FIG. 3 shows a placement of the object of FIG. 2 that violates at least one rule applicable to the virtual scene, according to embodiments, FIG. 4A exemplifies replacement of an object in the virtual scene of FIG. 1A when the size of the virtual scene is reduced, FIG. 4B exemplifies replacement of an object in the virtual scene of FIG. 1A when the size of the virtual scene is reduced, FIG. 4C exemplifies deletion of an object in the virtual scene of FIG. 1A when the size of the virtual scene is reduced, FIG. 4D exemplifies replacement of an object in the virtual scene of FIG. 1A when the size of the virtual scene is increased.

FIG. 3 shows a placement of the washing machine 104 of FIG. 2 that violates at least one rule applicable to the virtual scene, according to embodiments. As shown in greater detail in the enlarged portion in FIG. 3, the washing machine has been placed at a distance 302 from the sink 106 which is smaller than what is defined by the bounding box 202. The smallest distance 304 in this case is thus larger than the actual distance 302.

Figure 4A:
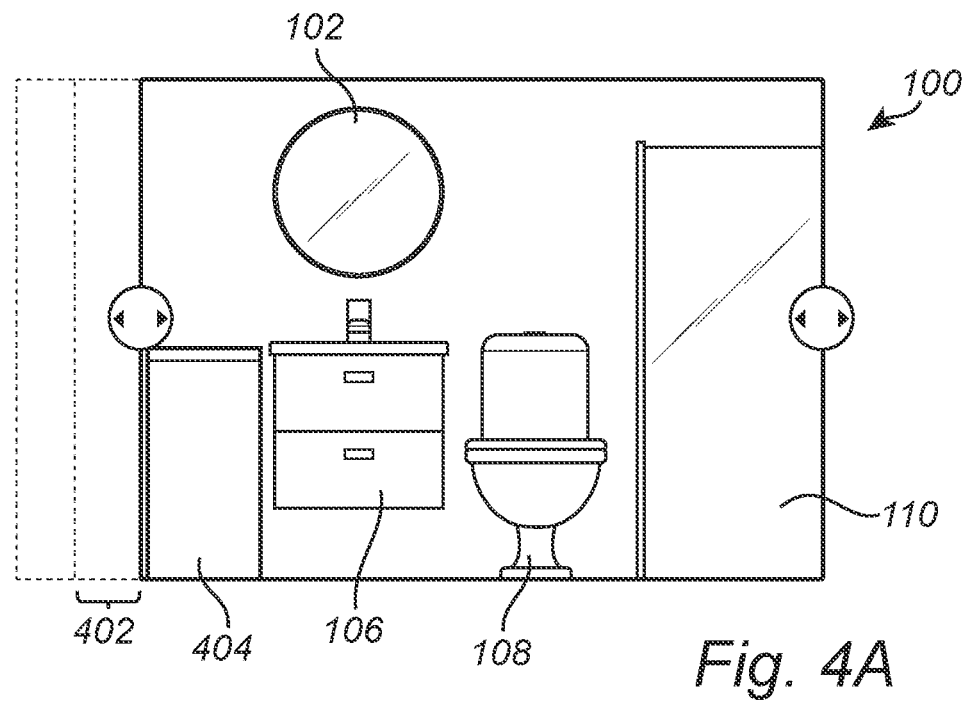

FIG. 4A shows a situation where the situation of FIG. 3 applies. In FIG. 4A, a request to reduce the size in a horizontal direction is received. The reduction corresponds to reducing the horizontal dimension with a length 402. Since the washing machine 104 would be positioned too close to the sink 106 (as shown in FIG. 3), in the example of FIG. 4A, the washing machine is replaced by another object that occupies a subspace of the scene that is smaller compared to the subspace of the washing machine 104. The washing machine 104 is in this case replaced with a smaller washing machine 404. This means that the functionality of the virtual scene 100 (bathroom with washing machine) is kept while all objects enabling the functionality may still fit into the virtual scene 100 (complying with the rule(s) that apply to the virtual scene 100, such as design rules, regulations and codes, etc.) according to the reduced size of the virtual scene 100.

In some embodiments, each of the plurality of objects 102-110 is associated with a level of importance of the object in the virtual scene 100. For example, laundry functionality may be considered (by a user providing or ranking the importance of the functionality of the virtual scene using an input device as described herein, or by the system automatically determining the importance based e.g., on heuristics, historical data or similar) the least important functionality of a bathroom, compared to e.g., showering, looking at oneself in the mirror, washing hands and using a toilet. Consequently, when selecting an object among the plurality of objects 102-110 to replace (or delete as further exemplified below in conjunction with FIG. 4C), the least important objects (according to its functionality) may be selected. In other words, selecting one object to replace/delete comprises identifying the object 104 from the plurality of objects 102-110 with a comparably lowest level of importance. Moreover, the selection of the object may also consider if replacing/deletion of that object would reduce the area/volume of the virtual space that the combined objects occupy (the footprint of the combined objects), such that replacing/deleting would mean that the remaining objects would fit into the new size of the virtual scene 100. For example, replacing or deleting the mirror 102 may not influence the required size in the horizontal direction which may mean that the mirror 102 is not selected for replacement/deletion. The level of importance may as mentioned above be configured by a user or be predefined based on the functionality of the virtual space 100.

The washing machine 104 is thus replaced by a smaller washing machine 404. In some embodiments, at least some of the plurality of objects 102-110 are associated with a respective metadata indicating one or more replacement objects, wherein the step of determining a replacement object comprises selecting one of the one or more replacement objects indicated in the second metadata associated with the object being replaced. The replacement objects may be defined by the user (using an input device), or predefined by the system (e.g., via a lookup-table), according to the functionality of the object in question. For example, replacement objects for the washing machine 104 may comprise other washing machines. In some embodiments, an object 102-110 in the virtual scene is associated with a category, such as a price category or a style category. In this case, the replacement object selected may be based on the category, such that a replacement object having the same style as the object being replaced is selected, or a replacement object having the same price level as the object being replaced is selected.

Moreover, when an object to be replaced in the virtual scene is selected, the system may consider if any replacement objects exist at all, and if any suitable replacement objects exist (e.g., with a smaller footprint such that it occupies a smaller area/volume of the virtual scene, and possibly according to category). In some embodiments, the system may first make any possible replacement of the objects in the virtual scene 100 (to reduce the required size of the virtual scene in which the objects fit) before starting to delete objects from the virtual scene to reduce the size requirements.

In the example of FIG. 4A, an object 104 close to the perimeter of the virtual scene is selected and replaced. However, in case an object in the center of the virtual scene is selected and replaced/deleted, the remaining objects may still not fit the virtual scene with the new size. If it is detected that at least one object of the plurality of objects still does not fit the reduced size of the virtual scene, a further repositioning of at least one object of the plurality of objects in the virtual scene may be conducted, such that each object of the plurality of objects fits the scene.

Figure 4B:
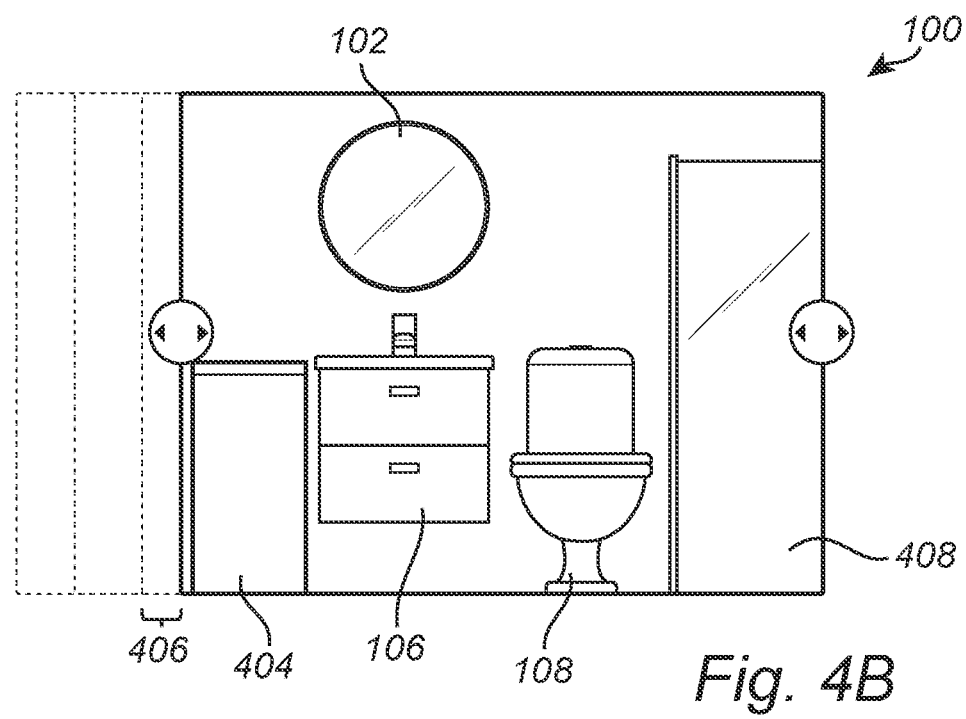

In FIG. 4B, a request to reduce the size in a horizontal direction is received. The reduction corresponds to reducing the horizontal dimension with a length 406. Reducing the size of the virtual scene 100 at this stage requires that either an object is deleted or replaced with a smaller object. In FIG. 4B, the shower cabin 110 is selected (based on level of importance, and/or existing suitable replacement objects as discussed above) and replaced. In this example, the washing machine 404 (which may have a lower importance compared to the shower cabin as discussed above) has no suitable replacement objects to reduce the footprint of the washing functionality of the bathroom. Consequently, the object having the second lowest importance may be selected, in this example the shower cabin 110. The shower cabin 110 is replaced by a shower cabin 408 with a smaller size, resulting in that the objects 404, 106, 108, 102, and 408 still fit the size of the virtual scene 100, and the functionality of the virtual scene is kept.

Figure 4C:
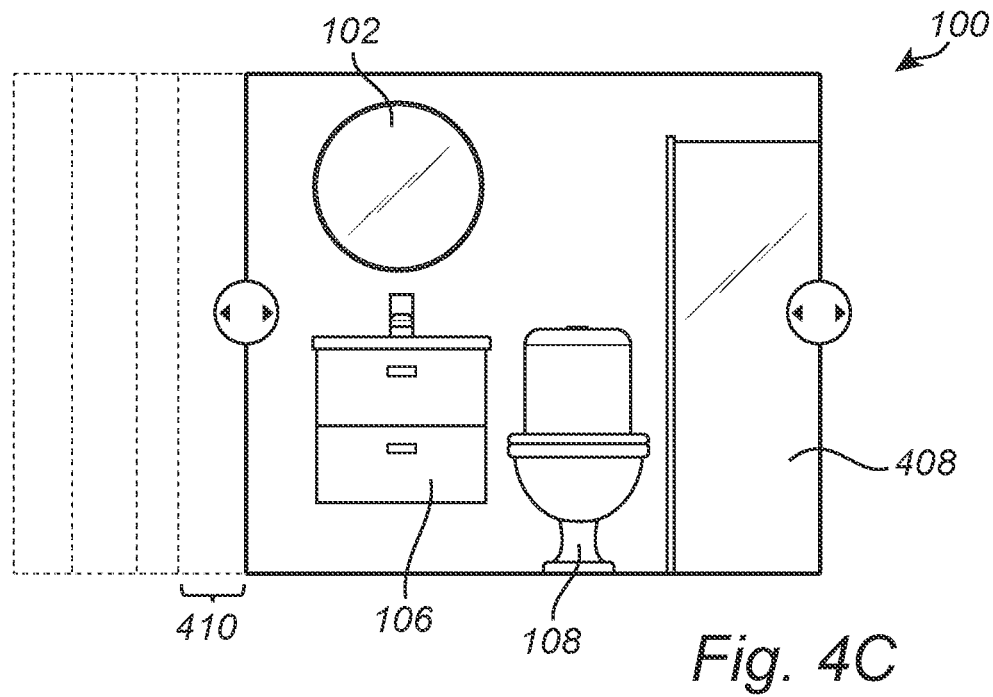

In FIG. 4C, a request to reduce the size (i.e., compared to the size of FIG. 4B) in a horizontal direction is received. The reduction corresponds to reducing the horizontal dimension with a length 410. In this example, it is not possible to replace any of the objects 404, 106, 108, 102, 408 in the virtual scene 100 to reduce the size needed to fit all the objects 404, 106, 108, 102, 408 in the virtual scene 100 and still adhere to the rules that apply to the scene. Consequently, an object needs to be deleted. In examples, the object having the lowest level of importance is selected, in this case the washing machine 404, and deleted from the virtual scene 100.

Figure 4D:
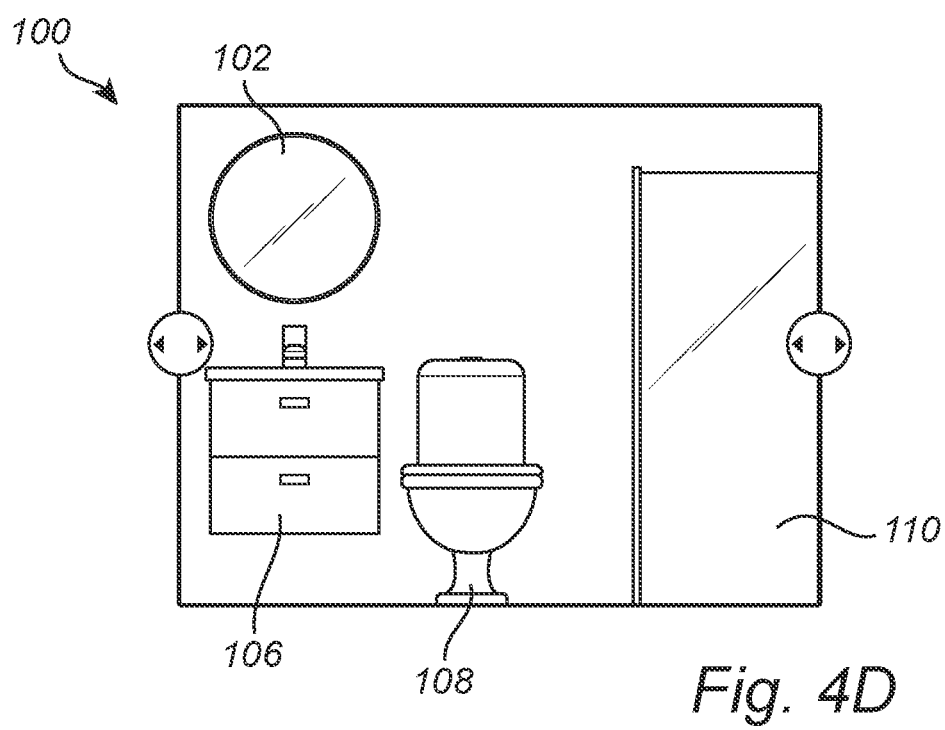

In FIG. 4D, a request to increase the size in a horizontal direction is received. This means that larger objects may again fit the virtual scene 100. One object of the plurality of objects 106, 108, 408 is selected. In some embodiments, the object having the highest level of importance is selected. In some embodiments, the object having the highest level of importance and a suitable replacement object with a larger size is selected. In some embodiments, an object that previously have been included as a replacement object in the virtual scene is selected, i.e., an object, such as the shower cabin 408, that has been added to the virtual scene 100 as a replacement object to a larger object with the same/similar functionality. In the example of FIG. 4D, the shower cabin 408 is selected and replaced with the original shower cabin 110.

Figure 5:
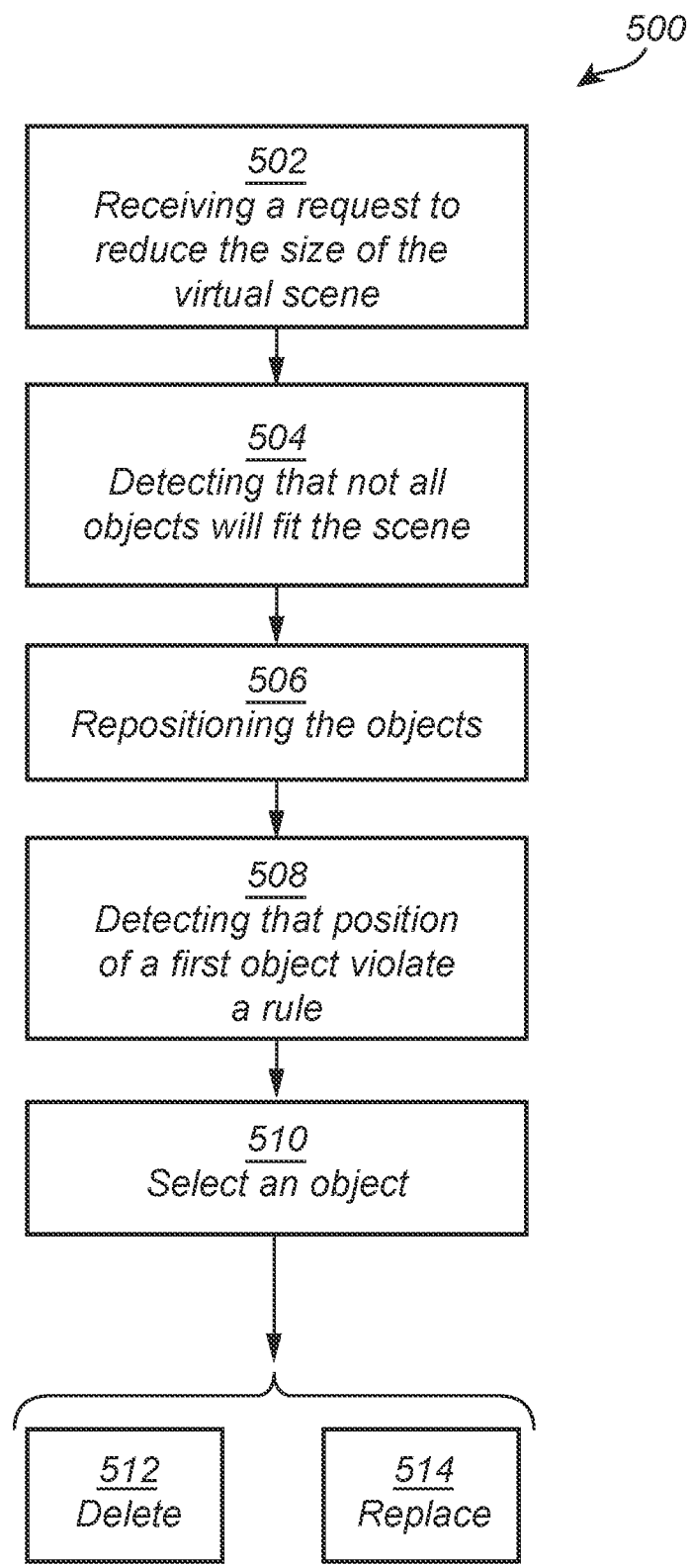
FIG. 5 shows a flow chart of a method of handling objects in a virtual scene when the size of the virtual scene changes, according to embodiments.

FIG. 5 shows a flow chart of a method 500 of handling objects in a virtual scene when the size of the virtual scene changes, according to embodiments. The method 500 is conducted on a virtual scene having a size and comprising a plurality of objects, each occupying a subspace of the virtual scene.

The method of FIG. 5 as well as other methods described herein may be performed with aid of a system comprising one or more devices, such as for example an output device, an input device and one or more processing devices. The virtual scene may be rendered using an output device and displayed to a user. The output device may for example comprise a computer monitor, a smart phone, tablet, etc., or using a virtual reality (VR) or augmented reality (AR) headset.

The method 500 comprises receiving 502 a request to reduce the size of the virtual scene. The request (and similar requests as described herein) may be received (e.g., by a processing device) from a user via an input device, such as a keyboard, computer mouse, touch screen, etc., or using voice control. The method 500 further comprises detecting 504 that all objects will not fit the scene, due to the reduced size. The method 500 further comprises repositioning 506 the objects such that they will fit the scene. The method 500 further comprises detecting that a position of a first object of the plurality of objects violates at least one rule applicable to the virtual scene. The method 500 further comprises selecting 510 an object of the plurality of objects, and either deleting 512 the selected object or replacing 514 the selected object with another object. It should be noted that the method of FIG. 5 may be implemented by a single device such as for example a server. Any input may be received from a remote device such as for example a computer connected to the server using e.g., internet, and the virtual scene may be rendered by a display connected to the computer.

The above embodiments are to be understood as illustrative examples of the invention. Further embodiments of the invention are envisaged. For example, in some embodiments, manual repositioning (by a user) may be facilitated, e.g., by receiving a repositioning request for an object of the plurality of objects, the rearranging request indicating a location for said object in the virtual scene; and repositioning the object in the virtual scene according to the repositioning request. The manual request may override any automatic repositioning requests. In some embodiments, if the manual repositioning request violates a rule applicable to the virtual scene, the user may be warned and must confirm the repositioning before it is carried out.

A first alternative aspect of the present invention is a computer implemented method comprising the steps of:
  identifying a plurality of objects (102, 104, 106, 108, 110, 404, 408) in a virtual scene (100), the virtual scene having a size (120, 122);
  for each object of the plurality of objects, determining a subspace within the virtual scene occupied by the object;
  receiving (502) a request to reduce the size of the virtual scene;
  detecting (504) that at least one object of the plurality of objects does not fit the reduced size of the virtual scene;
  repositioning (506) at least one object of the plurality of objects in the virtual scene such that each object of the plurality of objects fits the scene;
  based on the subspace of a first object of the plurality of objects, detecting (508) that a placement of the first object in the virtual scene violates at least one rule applicable to the virtual scene;
  selecting (510) one object of the plurality of objects, and at least one of:
    deleting (512) the selected object from the virtual scene; and
    determining (514) a replacement object occupying a subspace of the scene being smaller compared to the subspace of the selected object, and replacing, in the virtual scene, the selected object with the replacement object.

A second alternative aspect of the present invention is a non-transitory computer-readable storage medium having stored thereon instructions for implementing the method according to the first alternative aspect when executed on a device having processing capabilities.

A third alternative aspect of the present invention is a system comprising:
  one or more processors; and
  one or more non-transitory computer-readable media storing computer executable instructions that, when executed by the one or more processors, cause the system to perform actions comprising:
    identifying a plurality of objects (102, 104, 106, 108, 110, 404, 408) in a virtual scene (100), the virtual scene having a size (120, 122);
    for each object of the plurality of objects, determining a subspace within the virtual scene occupied by the object;
    receiving (502) a request to reduce the size of the virtual scene;
    detecting (504) that at least one object of the plurality of objects does not fit the reduced size of the virtual scene;
    repositioning (506) at least one object of the plurality of objects in the virtual scene such that each object of the plurality of objects fits the scene;
    based on the subspace of a first object of the plurality of objects, detecting (508) that a placement of the first object (104) in the virtual scene violates at least one rule applicable to the virtual scene;

selecting (510) one object of the plurality of objects, and at least one of:
  deleting (512) the selected object from the virtual scene; and
  determining (514) a replacement object occupying a subspace of the scene being smaller compared to the subspace of the selected object, and replacing, in the virtual scene, the selected object with the replacement object.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method comprising the steps of:
  identifying a plurality of objects in a virtual scene, the virtual scene having a size;
  for each object of the plurality of objects, determining a subspace within the virtual scene occupied by the object;
  receiving a request to reduce the size of the virtual scene;
  detecting that at least one object of the plurality of objects does not fit the reduced size of the virtual scene;
  upon detecting that at least one object of the plurality of objects does not fit the reduced size of the virtual scene, repositioning at least one object of the plurality of objects in the virtual scene such that each object of the plurality of objects fits the scene;
  after the repositioning, based on the subspace of a first object of the plurality of objects, detecting that a placement of the first object in the virtual scene violates at least one rule applicable to the virtual scene;
  upon detecting that the placement of the first object in the virtual scene violates the at least one rule applicable to the virtual scene, selecting one object of the plurality of objects, and at least one of:
    deleting the selected object from the virtual scene; and
    determining a replacement object occupying a subspace of the scene being smaller compared to the subspace of the selected object, and replacing, in the virtual scene, the selected object with the replacement object.

2. The computer implemented method of claim 1, further comprising, after deleting and/or replacing the selected object, the steps of:
  detecting that at least one object of the plurality of objects does not fit the reduced size of the virtual scene; and
  repositioning at least one object of the plurality of objects in the virtual scene such that each object of the plurality of objects fits the scene.

3. The computer implemented method of claim 1, wherein, the request to reduce the size of the virtual scene comprises reducing a size of the virtual scene in at least one or more of a first, second and third dimension, wherein the step of repositioning at least one object of the plurality of objects in the virtual scene comprises moving the at least one object in a corresponding one or more of the first, second or third dimension.

4. The computer implemented method of claim 1, wherein each object of the plurality of objects is associated with first metadata indicating at least one of:
  a smallest distance in the virtual scene from the subspace of the object to the subspace of an adjacent object among the plurality of objects, and
  a smallest distance in the virtual scene from the subspace of the object to a fixed feature of the virtual scene.

5. The computer implemented method of claim 4, wherein the step of detecting that a placement of the first object in the virtual scene violates at least one rule applicable to the virtual scene comprises:
  identifying a smallest distance between the first object and a second object of the plurality of objects based on the first metadata associated with the first and the second object;
  detecting a distance between the subspace of the first object in the virtual scene and the subspace of the second object in the virtual scene;
  upon the distance being smaller than the smallest distance, detecting that placement of the first object in the virtual scene violates said at least one rule applicable to the virtual scene.

6. The computer implemented method of claim 4, wherein the step of detecting that a placement of the first object in the virtual scene violates at least one rule applicable to the virtual scene comprises:
  identifying a smallest distance between the first object and a fixed feature of the virtual scene based on the first metadata associated with the first object;
  detecting a distance between the subspace of the first object in the virtual scene and a fixed feature of the virtual scene;
  upon the distance being smaller than the smallest distance, detecting that placement of the first object in the virtual scene violates said at least one rule applicable to the virtual scene.

7. The computer implemented method of claim 1, wherein each of the plurality of objects is associated with a level of importance of the object in the virtual scene, wherein the step of selecting one object comprises identifying the object from the plurality of objects with a comparably lowest level of importance.

8. The computer implemented method of claim 1, further comprising:
  receiving a request to increase the size of the virtual scene;
  selecting one object of the plurality of objects;
  determining a replacement object occupying a subspace of the scene being larger compared to the subspace of the selected object, and replacing, in the virtual scene, the selected object with the replacement object.

9. The computer implemented method of claim 1, wherein at least some of the objects among the plurality of objects is associated with a respective second metadata indicating one or more replacement objects, wherein the step of determining a replacement object comprises selecting one of the one or more replacement objects indicated in the second metadata associated with the object being replaced.

10. The computer implemented method of claim 9, wherein each object of the plurality of objects is associated with a category, wherein each of the replacement objects is associated with a respective category, wherein the step of selecting one of the one or more replacement objects is based at least in part on a comparison between the category associated with the object being replaced and the category of each of the one or more replacement objects.

11. The method of claim 1, further comprising:
receiving, from a user, a repositioning request for an object of the plurality of objects, the repositioning request indicating a location for said object in the virtual scene; and
repositioning the object in the virtual scene according to the repositioning request.

12. A non-transitory computer-readable storage medium having stored thereon instructions for implementing, when executed on a device having processing capabilities, a computer implemented method comprising the steps of:
identifying a plurality of objects in a virtual scene, the virtual scene having a size;
for each object of the plurality of objects, determining a subspace within the virtual scene occupied by the object;
receiving a request to reduce the size of the virtual scene;
detecting that at least one object of the plurality of objects does not fit the reduced size of the virtual scene;
upon detecting that at least one object of the plurality of objects does not fit the reduced size of the virtual scene, repositioning at least one object of the plurality of objects in the virtual scene such that each object of the plurality of objects fits the scene;
after the repositioning, based on the subspace of a first object of the plurality of objects, detecting that a placement of the first object in the virtual scene violates at least one rule applicable to the virtual scene;
upon detecting that the placement of the first object in the virtual scene violates the at least one rule applicable to the virtual scene, selecting one object of the plurality of objects, and at least one of:
deleting the selected object from the virtual scene; and
determining a replacement object occupying a subspace of the scene being smaller compared to the subspace of the selected object, and replacing, in the virtual scene, the selected object with the replacement object.

13. A system comprising:
one or more processors; and
one or more non-transitory computer-readable media storing computer executable instructions that, when executed by the one or more processors, cause the system to perform actions comprising:
identifying a plurality of objects in a virtual scene, the virtual scene having a size;
for each object of the plurality of objects, determining a subspace within the virtual scene occupied by the object;
receiving a request to reduce the size of the virtual scene;
detecting that at least one object of the plurality of objects does not fit the reduced size of the virtual scene;
upon detecting that at least one object of the plurality of objects does not fit the reduced size of the virtual scene, repositioning at least one object of the plurality of objects in the virtual scene such that each object of the plurality of objects fits the scene;
after the repositioning, based on the subspace of a first object of the plurality of objects, detecting that a placement of the first object in the virtual scene violates at least one rule applicable to the virtual scene;
upon detecting that the placement of the first object in the virtual scene violates the at least one rule applicable to the virtual scene, selecting one object of the plurality of objects, and at least one of:
deleting the selected object from the virtual scene; and
determining a replacement object occupying a subspace of the scene being smaller compared to the subspace of the selected object, and replacing, in the virtual scene, the selected object with the replacement object.

14. The system according to claim 13, wherein each object of the plurality of objects is associated with first metadata indicating a smallest distance in the virtual scene from the subspace of the object to the subspace of an adjacent object among the plurality of objects, wherein detecting that a placement of the first object in the virtual scene violates at least one rule applicable to the virtual scene comprises:
identifying a smallest distance between the first object and a second object of the plurality of objects based on the first metadata associated with the first and the second object;
detecting a distance between the subspace of the first object in the virtual scene and the subspace of the second object in the virtual scene;
upon the distance being smaller than the smallest distance, detecting that placement of the first object in the virtual scene violates said at least one rule applicable to the virtual scene.

15. The system according to claim 13, wherein each of the plurality of objects is associated with a level of importance of the object in the scene, wherein the selecting one object comprises identifying the object from the plurality of objects with a comparably lowest level of importance.

* * * * *